United States Patent
Weber

(10) Patent No.: US 10,439,171 B2
(45) Date of Patent: Oct. 8, 2019

(54) CO-LOCATED BATTERY AND RESERVOIR ASSEMBLY

(71) Applicant: L-3 Communications Corporation, New York, NY (US)

(72) Inventor: Richard M. Weber, Prosper, TX (US)

(73) Assignee: L-3 Communications Corporation, New York, NY (US)

( * ) Notice: Subject to any disclaimer, the term of this patent is extended or adjusted under 35 U.S.C. 154(b) by 930 days.

(21) Appl. No.: 14/828,122

(22) Filed: Aug. 17, 2015

(65) Prior Publication Data
US 2017/0054114 A1   Feb. 23, 2017

(51) Int. Cl.
  *H01M 2/02*   (2006.01)
  *H01M 2/10*   (2006.01)
  *H01M 6/36*   (2006.01)

(52) U.S. Cl.
  CPC .......... *H01M 2/022* (2013.01); *H01M 2/1055* (2013.01); *H01M 6/36* (2013.01)

(58) Field of Classification Search
  CPC ....... H01M 2/022; H01M 2/1055; H01M 6/36
  See application file for complete search history.

(56) References Cited

U.S. PATENT DOCUMENTS

| | | | | |
|---|---|---|---|---|
| 6,428,925 B1* | 8/2002 | Takeno | ................. | H01M 2/105 429/159 |
| 2010/0151301 A1* | 6/2010 | Paik | ..................... | H01M 2/024 429/94 |
| 2012/0114995 A1* | 5/2012 | Qiu | ........................ | H01M 2/263 429/94 |
| 2012/0301755 A1* | 11/2012 | Axelsson | ................. | B60K 6/48 429/62 |

* cited by examiner

*Primary Examiner* — Lingwen R Zeng
(74) *Attorney, Agent, or Firm* — Egan Peterman Enders Huston

(57) ABSTRACT

A battery-powered system comprising: 1) a housing adapted to contain electro-mechanical machines; and 2) an apparatus disposed within the housing. The apparatus comprises: i) a battery configured as an annular cylinder having an inner diameter, an outer diameter, and a length; and ii) a cylindrical device disposed within a cavity formed by the annular cylinder of the battery. An outer diameter of the cylindrical device is substantially the same as the inner diameter of the battery and the cylindrical device has a length substantially equal to the length of the battery. The cylindrical device may be a fluid reservoir or a second battery.

21 Claims, 6 Drawing Sheets

CO-LOCATED BATTERY AND RESERVOIR ASSEMBLY

TECHNICAL FIELD

The present application relates generally to battery technology and, more particularly, to a space-efficient battery and fluid reservoir assembly.

BACKGROUND

Many engineering applications require integrating a number of assemblies inside a housing or chassis having only a limited amount of space. Many vehicles, including trucks, buses, automobiles, aircraft, and trains, have restrictions on both weight and volume. Similarly, many machines, including heating systems, air conditioning units, water heaters, and other electromechanical systems, must also fit within a confined space and are therefore limited in their volumes.

Nonetheless, there is continued pressure not only to further reduce the size of many of these systems, but also to pack more components into the space that is available. New systems with increased functionality and higher levels of performance require more power that may be supplied by a thermal or reserve battery. The systems may also require a coolant or hydraulic fluid reservoir or a storage bottle for compressed air or other gas.

Therefore, there is a need for an effective way to package both a battery and a fluid reservoir that requires the minimum packaging volume.

SUMMARY

To address the above-discussed deficiencies of the prior art, it is a primary object to provide an apparatus comprising: 1) a battery configured as an annular cylinder having an inner diameter, an outer diameter, and a length; and 2) a cylindrical device disposed within a cavity formed by the annular cylinder of the battery.

In one embodiment, the outer diameter of the cylindrical device is substantially the same as the inner diameter of the battery.

In another embodiment, the cylindrical device has a length substantially equal to the length of the battery.

In still another embodiment, the cylindrical device is a fluid reservoir.

In yet another embodiment, the cylindrical device is a second battery.

It is another object to provide a battery-powered system comprising: 1) a housing adapted to contain electro-mechanical machines; and 2) an apparatus disposed within the housing. The apparatus comprises: i) a battery configured as an annular cylinder having an inner diameter, an outer diameter, and a length; and ii) a cylindrical device disposed within a cavity formed by the annular cylinder of the battery. An outer diameter of the cylindrical device is substantially the same as the inner diameter of the battery and the cylindrical device has a length substantially equal to the length of the battery. In one embodiment, the cylindrical device is a fluid reservoir. In another embodiment, the cylindrical device is a second battery.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 6, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged battery powered system.

Figure 1:
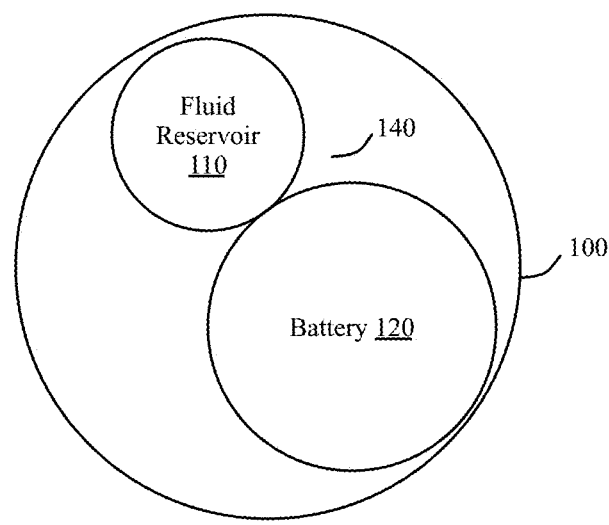
FIG. 1 illustrates a conventional configuration of a battery and a fluid reservoir within a circular housing.
Figure 2:
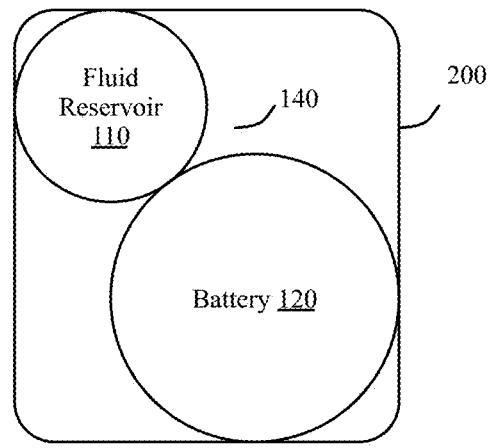
FIG. 2 illustrates a conventional configuration of a battery and a fluid reservoir within a rectangular housing.

FIG. 1 illustrates a conventional configuration of battery 120 and fluid reservoir 110 within circular housing 100. Housing 100 may be any type of chassis, enclosure, or vehicle body that has a circular cross-section and is adapted to contain electro-mechanical machines. FIG. 2 illustrates a conventional configuration of battery 120 and fluid reservoir 100 within rectangular housing 200. Housing 200 may be any type of chassis, enclosure, or vehicle body that has a rectangular cross-section and is adapted to contain electro-mechanical machines. For example, one or both of housings 100 and 200 may be the exterior walls of a heating system, an air conditioning system, a water heater, a water cooler, a water filtration system, a motor, an aircraft fuselage, a marine vehicle, and the like.

FIGS. 1 and 2 demonstrate the problems inherent in conventional configurations of batteries and fluid reservoirs. Thermal and reserve batteries in electro-mechanical systems have traditionally been built as round cylinders. Similarly, reservoirs for storing and supplying liquids batteries in electro-mechanical systems also have traditionally been built as round cylinders. There may be a considerable amount of inefficient packaging volume when a fluid reservoir and a battery are both needed in a system, as exhibited by wasted space 140 around battery 120 and fluid reservoir 110 in FIGS. 1 and 2. In some cases, circuit card assemblies (CCAs) are shaped to make use of otherwise wasted space 140. This results in CCAs with compromised layouts and decreased access and modularity. The situation is further complicated if the reservoir and the battery are different lengths, resulting in wasted space above or below the shorter devices.

The present disclosure provides an efficient use of packaging volume in which to co-locate a battery and a fluid reservoir. The improved design maximizes the space available for other electro-mechanical machines or assemblies, such as circuit card assemblies. The disclosed design packages the battery and the reservoir as a single assembly. The battery is built as an annular cylinder whose center cavity houses the cylindrical reservoir. The battery and reservoir are designed to be the same length, which ensures the minimal length is used.

The outer diameter (OD) of the battery is not a design variable, but is selected to fit within housing 100 or housing 200. The inner diameter (ID) of the battery and the outer diameter (OD) of the fluid reservoir are substantially equal since the fluid reservoir cylinder fits snugly into the cavity of the annular cylinder of the battery. The design procedure iterates the dimensions of the battery and reservoir by varying the battery ID and the reservoir OD in unison. The lengths of the battery and the reservoir are also varied in unison. The final design results in a reservoir and a battery that have the same length and a matched ID and OD that enables each device to meet its required performance specifications, while minimizing the combined volume of the two devices. Alternately, this approach could be used to co-locate two different batteries rather than a battery and a fluid reservoir.

Figure 3:
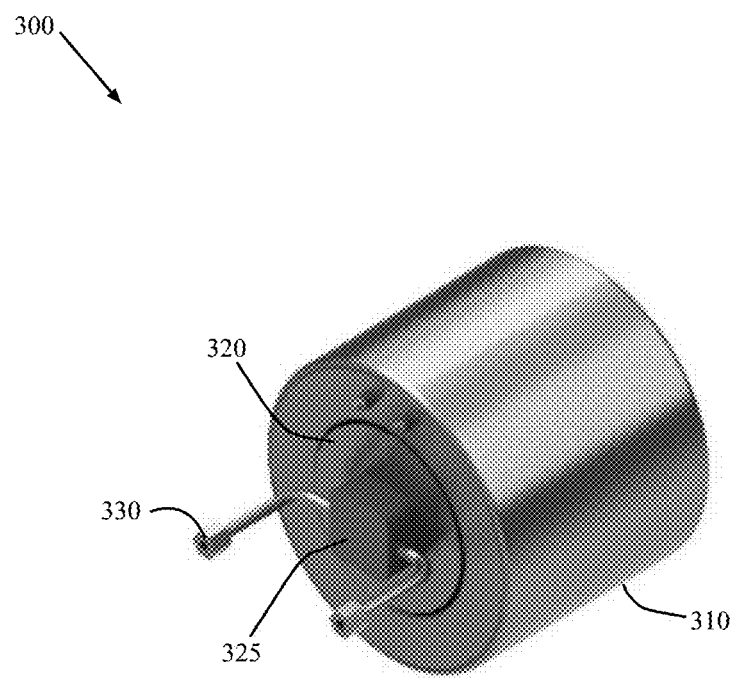
FIG. 3 illustrates a perspective view of a battery and fluid reservoir assembly according to an embodiment of the disclosure.
Figure 4:
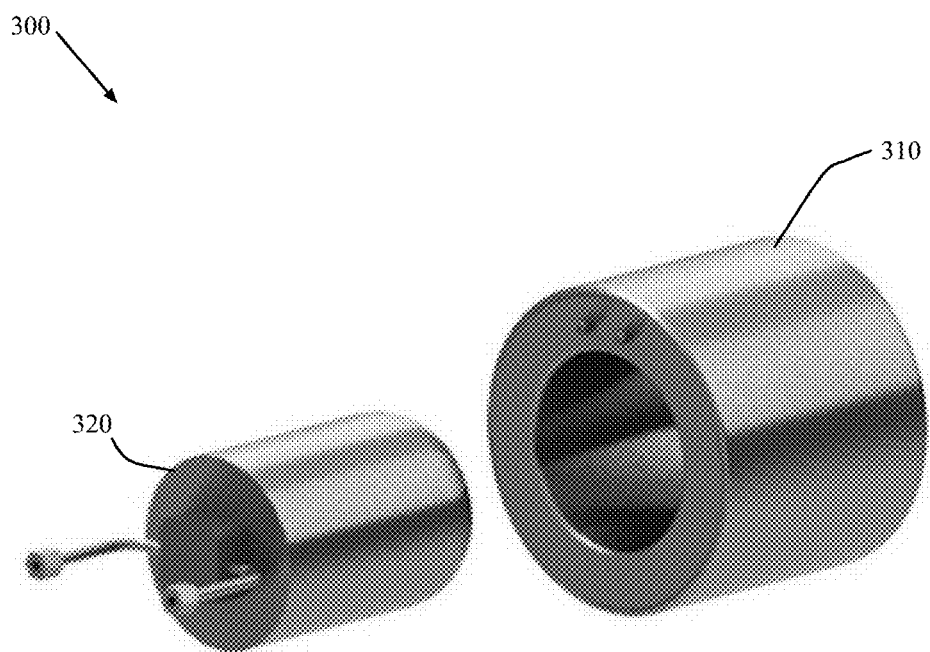
FIG. 4 illustrates an exploded view of the battery and fluid reservoir assembly in FIG. 3 according to an embodiment of the disclosure.

FIG. 3 illustrates a perspective view of battery and fluid reservoir assembly 300 according to an embodiment of the disclosure. FIG. 4 illustrates an exploded view of battery and fluid reservoir assembly 300 in FIG. 3 according to an embodiment of the disclosure. Battery and fluid reservoir assembly 300 is intended to replace the separate battery 120 and fluid reservoir 110 in housing 100 and housing 200 in FIGS. 1 and 2. This minimizes wasted space 140 in housings 100 and 200.

Assembly 300 comprises battery 310 and fluid reservoir 320. Fluid reservoir 320 comprises valve (or regulator) 325, pipe (or tube) 330, and an internal piston (not shown). The internal piston is electro-mechanically operated and drives fluid (e.g., hydraulic fluid, oil, water, coolant, etc.) into valve 325 and pipe 330. Battery 310 is shaped like an annular cylinder and is sized so that cylindrical fluid reservoir 320 fits snugly within the cavity of the annular cylinder. Thus, the inner diameter (ID) of battery 310 is only slightly greater than the outer diameter (OD) of fluid reservoir 320.

Figure 5:
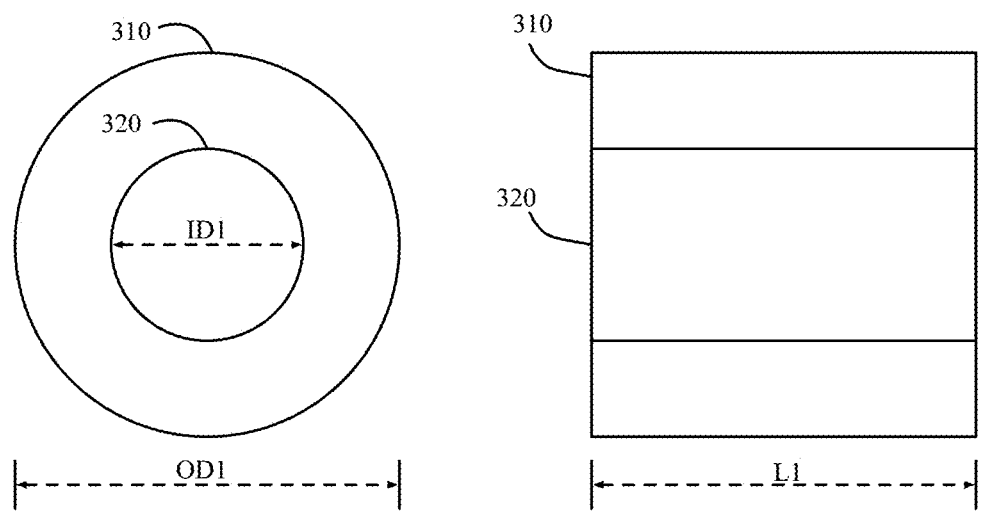
FIG. 5 illustrates an end view and a side view of the battery and fluid reservoir assembly in FIG. 3 according to an embodiment of the disclosure.

FIG. 5 illustrates an end view and a side view of battery and fluid reservoir assembly 300 in FIG. 3 according to an embodiment of the disclosure. In the exemplary embodiment, the inner diameter (ID1) of battery 310 and the outer diameter of fluid reservoir 320 are essentially the same value and are both labeled as ID1. The outer diameter of battery 310 is OD1. Battery 310 and fluid reservoir 320 both have the length L1.

Therefore, the total volume of the combined assembly 300 is:

$$V(\text{total}) = \pi(OD1^2)L1/4.$$

The volume of fluid reservoir 320 is:

$$V(\text{reservoir}) = \pi(ID1)^2 L1/4.$$

The volume of battery 310 is:

$$V(\text{battery}) = \pi(OD1^2 - ID1^2)L1/4.$$

Figure 6:
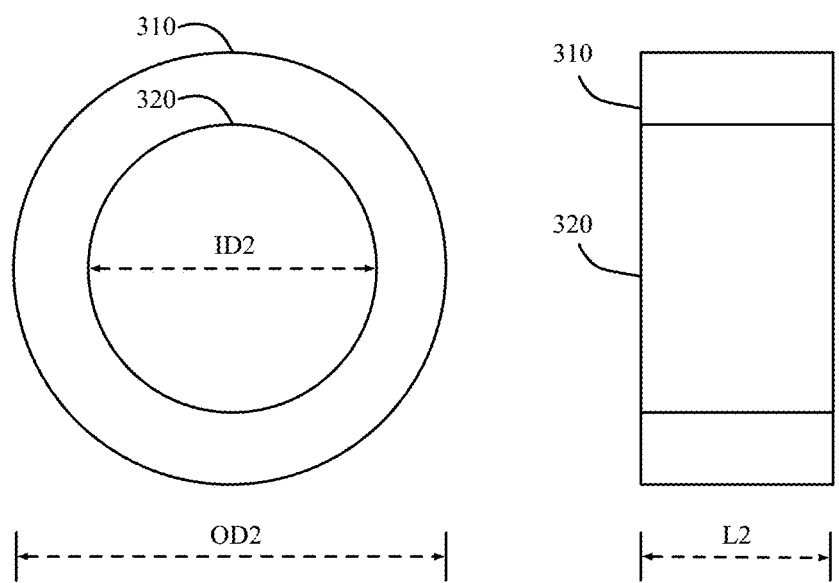
FIG. 6 illustrates an end view and a side view of the battery and fluid reservoir assembly in FIG. 3 according to another embodiment of the disclosure.

FIG. 6 illustrates an end view and a side view of battery and fluid reservoir assembly 300 in FIG. 3 according to another embodiment of the disclosure. In the second embodiment, a different set of design specifications for battery 310 and reservoir 320 results in different dimensions. The outer diameter and inner diameter are both larger compared to FIG. 5, but the overall length is shorter. Thus, OD2>OD1, ID2>ID1, and L2<L1. It is noted that dimensions are not necessarily to scale in FIGS. 5 and 6.

In the second embodiment, the total volume of the combined assembly 300 is:

$$V(\text{total}) = \pi(OD2)^2 L2/4.$$

The volume of fluid reservoir 320 is:

$$V(\text{reservoir}) = \pi(ID2)^2 L2/4.$$

The volume of battery 310 is:

$$V(\text{battery}) = \pi(OD2^2 - ID2^2)L2/4.$$

According to the disclosed embodiments, the overall volume of battery and fluid reservoir assembly 300 may be minimized for each application. The outer diameter is selected in order to fit assembly 300 within the corresponding chassis or housing of the application. For a given outer diameter, the inner diameter of the battery (equal to the outer diameter of the reservoir) and the length of the battery/reservoir are then varied in unison until the final volume of battery 310 can meet the design specifications for battery 310 and the final volume of reservoir 320 can meet the design specifications for reservoir 320. As noted, the fluid reservoir may be replaced by another battery in an application that requires two separate batteries.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. An apparatus comprising:
   a single battery configured as an annular cylinder having an inner diameter, an outer diameter, and a length; and
   a separate cylindrical device having an outer external wall disposed within a cylindrical cavity having an opening formed by the annular cylinder of the battery, the inner diameter of the battery being greater than the outer diameter of the separate cylindrical device such that the separate cylindrical device fits within the cylindrical cavity of the battery and blocks the opening of the cylindrical cavity,
   wherein the cylindrical device is a fluid reservoir contained entirely within the cylindrical cavity and storing fluid, and is configured to supply the fluid to a location spaced apart from and separate from the battery.

2. The apparatus as set forth in claim 1, wherein the cylindrical device has a length substantially equal to the length of the battery.

3. The apparatus as set forth in claim 1, wherein the fluid is a liquid.

4. A battery-powered system comprising:
- a housing adapted to contain electro-mechanical machines; and
- an apparatus disposed within the housing, the apparatus comprising:
  - a single battery configured as an annular cylinder having an inner diameter, an outer diameter, and a length; and
  - a separate cylindrical device having an outer external wall disposed within a cavity having an opening formed by the annular cylinder of the battery, the inner diameter of the battery being greater than the outer diameter of the separate cylindrical device such that the separate cylindrical device fits within the cylindrical cavity of the battery and blocks the opening of the cavity,
- wherein the cylindrical device is a fluid reservoir contained entirely within the cylindrical cavity and storing fluid, and is configured to supply the fluid to a separate part of the system that is spaced apart from and separately located from the battery.

5. The battery-powered system as set forth in claim 4, wherein the cylindrical device has a length substantially equal to the length of the battery.

6. The battery-powered system as set forth in claim 4, wherein the reservoir comprises a valve coupled to a pipe that originates at the reservoir and extends outwardly and away from the battery to the separate part of the system, and an internal piston within the reservoir that is configured to drive the stored liquid into the valve and pipe to deliver the stored fluid that originates from the reservoir to the separate part of the system.

7. The battery-powered system as set forth in claim 4, wherein the cylindrical cavity is entirely filled and occupied by the fluid reservoir.

8. The battery-powered system as set forth in claim 4, wherein the fluid liquid is at least one of hydraulic fluid, oil, water, or coolant.

9. The battery-powered system as set forth in claim 4, where the system is at least one of a heating system, an air conditioning system, a water heater, a water cooler, a water filtration system, a motor, an aircraft fuselage, or a marine vehicle; and where the battery and cylindrical device are separate components that supply the system.

10. The battery-powered system as set forth in claim 4, wherein the cylindrical device is a storage bottle containing compressed gas.

11. The battery-powered system as set forth in claim 4, where the fluid is hydraulic fluid.

12. An apparatus comprising:
- a single battery configured as an annular cylinder having an inner diameter, an outer diameter, and a length; and
- a fluid reservoir storing fluid and disposed within a cavity formed by the annular cylinder of the battery, wherein an outer diameter of the fluid reservoir is substantially the same as the inner diameter of the battery, where the fluid reservoir is configured to supply the stored fluid originating from the reservoir to a location spaced apart from and separate from the battery, and the fluid reservoir blocks an opening of the cavity.

13. The apparatus as set forth in claim 12, wherein the fluid reservoir has a length substantially equal to the length of the battery.

14. The apparatus as set forth in claim 12, wherein the reservoir comprises a valve coupled to a pipe that extends outwardly and away from the battery to a location that is remote from the battery, and an internal piston configured to drive the stored fluid into the valve and pipe to deliver the fluid to the remote location.

15. The apparatus as set forth in claim 12, wherein the cylindrical cavity is entirely filled and occupied by the fluid reservoir.

16. The apparatus as set forth in claim 12, wherein the fluid is at least one of hydraulic fluid, oil, water, or coolant.

17. A method comprising:
- providing a single battery configured as an annular cylinder having an inner diameter, an outer diameter, and a length; and
- inserting a separate cylindrical device having an outer external wall into a cylindrical cavity having an opening formed by the annular cylinder of the battery, the inner diameter of the battery being greater than the outer diameter of the separate cylindrical device such that the separate cylindrical device fits within the cylindrical cavity of the battery and blocks the opening of the cylindrical cavity,
- wherein the cylindrical device comprises:
  - a reservoir that comprises a valve coupled to a pipe that extends outwardly and away from the battery to a location that is remote from the battery, and an internal piston within the reservoir; and
- where the method further comprises using the internal piston to drive a stored fluid originating from within the reservoir into the valve and pipe to deliver the fluid from the reservoir to the remote location.

18. The method as set forth in claim 17, wherein the cylindrical cavity is entirely filled and occupied by the cylindrical device.

19. The method as set forth in claim 17, wherein the fluid is at least one of hydraulic fluid, oil, water, or coolant.

20. The method as set forth in claim 17, wherein the fluid is a hydraulic fluid.

21. The method as set forth in claim 17, where the steps of providing the single battery and inserting the separate cylindrical device further comprise:
- first selecting the outer diameter of the battery to fit within a housing of a system having performance specifications for each of the battery and the cylindrical device;
- then iteratively varying the inner diameter of the battery and the outer diameter of the cylindrical device in unison while iteratively varying the length of the battery and the length of the cylindrical device in unison until the cylindrical device and the battery have the same length and the inner diameter of the battery and outer diameter of the cylindrical device are matched to enable each of the battery and cylindrical device to meet its respective performance specifications with the cylindrical device inserted to block the opening of the cylindrical cavity.

* * * * *